United States Patent
Kushida et al.

(10) Patent No.: US 11,195,137 B2
(45) Date of Patent: Dec. 7, 2021

(54) MODEL-DRIVEN AND AUTOMATED SYSTEM FOR SHARED RESOURCE SOLUTION DESIGN

(71) Applicant: INTERNATIONAL BUSINESS MACHINES CORPORATION, Armonk, NY (US)

(72) Inventors: Takayuki Kushida, Tokyo (JP); Hamid R. Motahari Nezhad, San Jose, CA (US); Taiga Nakamura, Sunnyvale, CA (US); Scott R. Trent, Yokohama (JP); Peifeng Yin, San Jose, CA (US); Karen F. Yorav, Haifa (IL)

(73) Assignee: International Business Machines Corporation, Armonk, NY (US)

( * ) Notice: Subject to any disclaimer, the term of this patent is extended or adjusted under 35 U.S.C. 154(b) by 529 days.

(21) Appl. No.: 15/598,750

(22) Filed: May 18, 2017

(65) Prior Publication Data
US 2018/0336503 A1 Nov. 22, 2018

(51) Int. Cl.
*G06Q 10/06* (2012.01)
*H04L 29/08* (2006.01)

(52) U.S. Cl.
CPC ..... *G06Q 10/067* (2013.01); *G06Q 10/06313* (2013.01); *H04L 67/10* (2013.01)

(58) Field of Classification Search
CPC . G06Q 10/067; G06Q 10/06313; H04L 67/10
USPC ....................................................... 705/7.23
See application file for complete search history.

(56) References Cited

U.S. PATENT DOCUMENTS

| | | | |
|---|---|---|---|
| 6,571,282 B1 * | 5/2003 | Bowman-Amuah | ........................ H04L 67/303 709/219 |
| 6,578,068 B1 * | 6/2003 | Bowman-Amuah | ... G06F 9/465 709/203 |
| 7,664,713 B1 | 2/2010 | Haffner et al. | |
| 8,423,483 B2 | 4/2013 | Sadeh-Koniecpol et al. | |
| 8,612,976 B2 | 12/2013 | Arnold et al. | |

(Continued)

OTHER PUBLICATIONS

Aneka: A Software Platform for .NET-based Cloud Computing to Vecchiola et al., Aug. 2, 2009 (Year: 2009).*

(Continued)

*Primary Examiner* — Charles Guiliano
*Assistant Examiner* — Po Han Lee
(74) *Attorney, Agent, or Firm* — Sherman IP LLP; Kenneth L. Sherman; Steven Laut

(57) ABSTRACT

One embodiment provides model-driven and automated generation of information technology (IT) solutions including obtaining a set of business and technical requirements for IT infrastructure and applications. A client business and technical requirement model is generated based on generic model constructs and extending with constructs specific to capturing client requirements. A draft IT solution is generated using an automated model-driven process to generate the draft IT solution configuration for client requirements for a target shared resource environment offering. The generated draft IT solution is translated into a language of a constraint satisfaction engine that propagates values of chosen attributes in the draft solution to identify valid values for unset attributes, and identifies conflicts. An IT solutions interface is generated based on auto-population of verified attribute results.

20 Claims, 11 Drawing Sheets

Model-Driven Solution Generation

(56) References Cited

U.S. PATENT DOCUMENTS

| | | | |
|---|---|---|---|
| 8,682,820 B2 | 3/2014 | Robinson et al. | |
| 9,235,442 B2* | 1/2016 | Kampas | G06F 9/50 |
| 9,244,655 B1* | 1/2016 | Hadar | G06F 8/20 |
| 9,467,355 B2* | 10/2016 | Doering | H04L 41/5054 |
| 9,542,532 B1 | 1/2017 | Mcnair et al. | |
| 9,582,406 B1* | 2/2017 | Teplitsky | G06F 11/263 |
| 2004/0024773 A1 | 2/2004 | Stoffel et al. | |
| 2009/0007066 A1* | 1/2009 | Grechanik | G06F 8/72 |
| | | | 717/111 |
| 2009/0259503 A1* | 10/2009 | Allen | G06Q 10/06 |
| | | | 705/7.38 |
| 2011/0088011 A1* | 4/2011 | Ouali | G06F 8/10 |
| | | | 717/105 |
| 2011/0166952 A1* | 7/2011 | Manchikanti | G06Q 10/06 |
| | | | 705/26.4 |
| 2012/0042311 A1* | 2/2012 | Biran | G06F 9/5077 |
| | | | 718/1 |
| 2012/0185821 A1* | 7/2012 | Yaseen | G06F 8/10 |
| | | | 717/105 |
| 2012/0198447 A1* | 8/2012 | Osogami | G06F 9/5077 |
| | | | 718/1 |
| 2012/0233668 A1* | 9/2012 | Leafe | G06F 9/00 |
| | | | 726/4 |
| 2012/0304179 A1 | 11/2012 | Devarakonda et al. | |
| 2013/0238795 A1* | 9/2013 | Geffin | G06F 11/3051 |
| | | | 709/224 |
| 2013/0263120 A1* | 10/2013 | Patil | G06F 9/45558 |
| | | | 718/1 |
| 2014/0100912 A1* | 4/2014 | Bursey | H04W 4/70 |
| | | | 705/7.27 |
| 2014/0149492 A1* | 5/2014 | Ananthanarayanan | G06F 9/5072 |
| | | | 709/203 |
| 2014/0149494 A1* | 5/2014 | Markley | H04L 67/34 |
| | | | 709/203 |
| 2014/0149591 A1* | 5/2014 | Bhattacharya | H04L 67/1097 |
| | | | 709/226 |
| 2014/0279201 A1* | 9/2014 | Iyoob | G06Q 30/0631 |
| | | | 705/26.7 |
| 2014/0280918 A1* | 9/2014 | Grandhe | G06Q 30/0631 |
| | | | 709/224 |
| 2014/0280961 A1* | 9/2014 | Martinez | H04L 41/5054 |
| | | | 709/226 |
| 2015/0019590 A1* | 1/2015 | Brooks | G06F 16/214 |
| | | | 707/792 |
| 2015/0082370 A1* | 3/2015 | Jayaraman | H04L 63/20 |
| | | | 726/1 |
| 2015/0222723 A1* | 8/2015 | Adapalli | H04L 67/2809 |
| | | | 705/26.41 |
| 2015/0264119 A1* | 9/2015 | Shau | H04L 67/1002 |
| | | | 709/203 |
| 2015/0304230 A1 | 10/2015 | Suparna | |
| 2015/0324713 A1* | 11/2015 | Haas | G06Q 30/02 |
| | | | 705/7.27 |
| 2016/0041835 A1* | 2/2016 | Tung | G06F 9/5072 |
| | | | 718/1 |
| 2016/0080422 A1* | 3/2016 | Belgodere | H04L 63/20 |
| | | | 706/47 |
| 2016/0283879 A1 | 9/2016 | Behrendt et al. | |
| 2016/0315808 A1* | 10/2016 | Saavedra | H04L 67/42 |
| 2016/0357611 A1 | 12/2016 | Sapuram et al. | |
| 2017/0149687 A1* | 5/2017 | Udupi | H04L 47/78 |
| 2017/0262772 A1 | 9/2017 | Takigawa et al. | |
| 2017/0323089 A1* | 11/2017 | Duggal | H04W 4/00 |
| 2017/0373940 A1* | 12/2017 | Shahab | H04L 47/70 |
| 2018/0255100 A1 | 9/2018 | Degioanni et al. | |
| 2018/0302273 A1* | 10/2018 | Dome | H04L 67/34 |
| 2018/0332138 A1* | 11/2018 | Liu | G06F 9/4887 |

OTHER PUBLICATIONS

Mell, P., et al., "The NIST Definition of Cloud Computing", National Institute of Standards and Technology Special Publication 800-145, Sep. 2011, pp. 1-7, U.S. Department of Commerce, United States.

Chu, W.C-C. et al., An Approach of Quality of Service Assurance for Enterprise Cloud Computing (QoSAECC), Proceedings of the 2014 International Conference on Trustworthy Systems and their Applications, Jun. 9-10, 2014, pp. 7-13, IEEE, United States.

Anonymoously, "Method and System for Executing Litmus Tests for Cloud Solution Design", Oct. 26, 2010, pp. 1-6, IP.com, United States.

Anonymously, "Automated Reaction Triggered by External Events in Cloud Environments", Jul. 10, 2014, pp. 1-5, IP.com, United States.

List of IBM Patents or Applications Treated as Related.

Pawliczek, A., "Part to Part and Part to Whole Ratios", Aug. 1, 2012, Manhattan Prep, access online at <www.manhattanprep.com/gmat/blog/part-to-part-and-part-to-while-ratios/>.

Gui, Z. et al., "A service brokering and recommendation mechanism for better selecting clouc services", PloS one, vol. 9, No. 8, 2014.

Xu, Y. et al.,"An integrated solution-KAGFM for mass customization in customer-oriented design under cloud manufacturing environment", The International Journal of Advanced Manufacturing Technology, Apr. 1, 2016, vol. 84, No. 1 -4, pp. 85-101, Springer.

List of IBM Patents or Patent Applications Treated as Related; Nezhad, H.R.M et al., U.S. Appl. No. 17/208,834, filed Mar. 22, 2021.

* cited by examiner

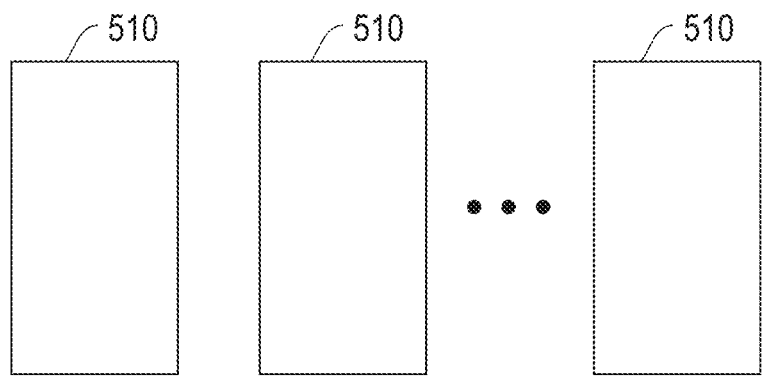
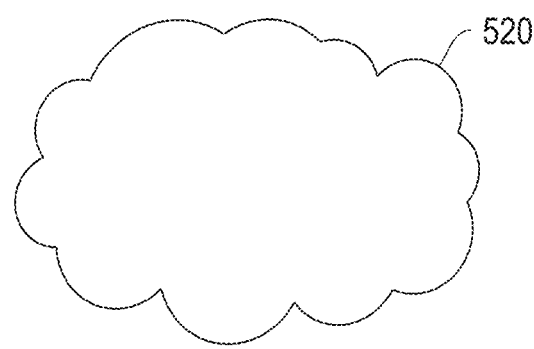
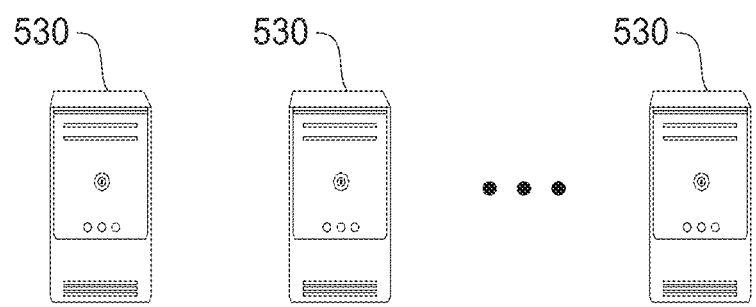
FIG. 5

800

| TABLE | Product_Types_Table | Unavailable SAP product | |
|---|---|---|---|
| SAP_Product | Product_Type | is_addOn:bool | analytic_workload:bool |
| Application Embedded Add-On | Middleware or Non-SAP Ap | Y | N |
| C4SAP Designated Add-On | Middleware or Non-SAP Ap | Y | N |
| Non-SAP Applications or Middleware | Middleware or Non-SAP Ap | N | N |
| SAP Application - Other | SAP Applications | N | N |
| SAP BI (BusinessObjects Business Intelligence) | SAP Applications | N | Y |
| SAP BPC (Business Planning and Consolidation) | SAP Applications | N | N |
| SAP BPO (Business Planning and Optimization) | SAP Applications | N | N |
| SAP Business Objects | SAP Applications | N | N |
| SAP Business Objects (Strategy Management) | SAP Applications | N | N |
| SAP BusinessObjects Data Services | SAP Applications | N | N |
| SAP BW (Business Warehouse) | SAP Applications | N | Y |
| SAP CE (Composition Environment) | SAP Applications | N | N |
| SAP CRM (Customer Relationship Management) | SAP Applications | N | N |
| SAP ECC (ERP Central Component) | SAP Applications | N | N |
| SAP EP (Enterprise Portal) | SAP Applications | N | N |
| SAP ERP | SAP Applications | N | N |
| SAP Financials (release 1503) | SAP Applications | N | N |
| SAP Fiori | SAP Applications | N | N |
| SAP for Banking | SAP Applications | N | N |
| SAP GRC Access Control | SAP Applications | N | N |
| SAP GRC Global Trade Services | SAP Applications | N | N |
| SAP In-Memory Appliance | SAP Applications | N | N |
| SAP KPRO (Knowledge Provider) | SAP Applications | N | N |
| SAP Landscape Transformation Server | SAP Applications | N | N |
| SAP Master Data Management (MDM) | SAP Applications | N | N |
| SAP Middleware Applications | Middleware or Non-SAP Ap | N | N |
| SAP Netweaver | SAP Applications | N | N |
| SAP Netweaver Business Warehouse Accelerator | SAP Applications | N | N |
| SAP Netweaver Process Integration | SAP Applications | N | N |
| SAP PI (Process Integrator) | SAP Applications | N | N |
| SAP PLM (Product Lifecycle Management) | SAP Applications | N | N |
| SAP PO (Process Orchestration) | SAP Applications | N | N |
| SAP Retail | SAP Applications | N | N |
| SAP SCM (Supply Chain Management) | SAP Applications | N | N |
| SAP Sfin1.0 / SAP Sfin2.0 | SAP Applications | N | N |
| SAP SLT | SAP Applications | N | N |
| SAP Solution Manager | SAP Applications | N | N |
| SAP SRM (Supplier Relationship Management) | SAP Applications | N | N |
| SAP Test Acceleration and Optimization | SAP Applications | N | N |
| SAP Test Data Migration | SAP Applications | N | N |
| SAP Transportation Management (SAP TM) | SAP Applications | N | N |
| Third Party Product | Middleware or Non-SAP Ap | N | N |

FIG. 8

Cloud Solution Design Tool (You have 5 active projects)    Logged in as USER 1 [LOGOUT]

Manage Projects  Project Overview  Business Inputs  Current IT Enviornment  Solution Output

< Go Back                                                                                                             Next View >

In this page, you can create and edit as SAP Solution (based on IC4SAP offering) for New Instances, or edit and update the generated solution for Existing instances.
The tool will check and validate the input against IC4SAP offering detention constraints.

Toolbar Design Editor | Graphical Design Editor                                [Debug validator] | Export Solution (Spreadsheet) | Show by Server Add Data Center

| Data Center Name | Data Center | DC Type |
|---|---|---|
| Raleigh | Raleigh | CMS |

| Landscape Name | Client Reference | Business Unit | DR | User Admin | User in Landscape | Comments |
|---|---|---|---|---|---|---|
| SAP CRM | SAP CRM | Insight | Raleigh | | | |

Add Landscape  Duplicate  Tools  Delete

| System Name | Product | Version | Service Scope | Role | SID | Phase | Application Type | DB Type | DB Size | Live Period | Server Names | SAP's | CPU's | RAM | Storage Size |
|---|---|---|---|---|---|---|---|---|---|---|---|---|---|---|---|
| SAP CRM_San_1 | SAP | 7.0EMP2 | Standard | Sandbox | - | 1 | AppWeb Serve DB Server | DB2 9.7 | 250 | 160 160 | SBX APP DB SBX APP DB | 6000 6000 | 1 1 | 4 4 | 64 64 |
| SAP CRM_Dev_1 | SAP | 7.0EMP2 | Standard | Dev | - | 2 | AppWeb Serve DB Server | DB2 9.7 | 250 | 6I60 6I60 | DevQA APP DB DevQA APP DB | 6000 6000 | 1 1 | 4 4 | 64 64 |
| SAP ECC_QA_1 | SAP | | | Standard | QA | 2 | | | | | | | | | |
| SAP CRM_QA_1 | SAP | 7.0EMP2 | Standard | QA | - | 2 | AppWeb Serve DB Server | DB2 9.7 | 500 | 6I60 6I60 | QA APP DB QA APP DB | 6000 6000 | 1 1 | 4 4 | 64 64 |

Add SAP System  Duplicate  Tools  Delete

MODEL-DRIVEN AND AUTOMATED SYSTEM FOR SHARED RESOURCE SOLUTION DESIGN

BACKGROUND

There are different levels of shared resource environment (e.g., a Cloud computing environment) managed services: managed infrastructure only (virtual machines, network, etc.), managed infrastructure, middleware, and database but not applications, and managed applications in which the service levels are defined at the application level. In some cloud hosting scenarios, clients may not have pre-existing applications, but may desire to get new applications, e.g., SAP (System, Applications and Products) or Oracle enterprise management software, hosted and managed by the cloud provider for them. In both scenarios, the starting point is capturing the client requirements. Specifically, the problem is migrating or hosting applications in the cloud environment, considering the application level requirements of the client. The application migration or hosting may also happen at different phases, for instance starting with a development phase in which the client expects to develop their applications, followed by a testing and quality assurance stage, and then production stage. The requirements for each of these phases of the application lifecycle in terms of size of the hosting virtual machines or appliances, the required service levels and the need for disaster recovery, database resiliency, backup, etc. may be different. This difference may be in the level of managed services that the client needs. For such large and complex application migration projects, there is an elaborate sales process in which a quote needs to be generated for the client requirements detailing all the required cloud hosting and management services. In today's enterprises, most such complex engagements are handled manually by sellers and solution architects or partially supported by Excel-based tools that would track cloud and service items that are included in the client's quote.

SUMMARY

Embodiments relate to model-driven and automated generation of information technology (IT) solutions. One embodiment provides a method for model-driven and automated generation of IT solutions including obtaining a set of business and technical requirements for IT infrastructure and applications. A client business and technical requirement model is generated based on generic model constructs and extending with constructs specific to capturing client requirements. A draft IT solution is generated using an automated model-driven process to generate the draft IT solution configuration for client requirements for a target shared resource environment offering. The generated draft IT solution is translated into a language of a constraint satisfaction engine that propagates values of chosen attributes in the draft solution to identify valid values for unset attributes, and identifies conflicts. An IT solutions interface is generated based on auto-population of verified attribute results.

These and other features, aspects and advantages of the present invention will become understood with reference to the following description, appended claims and accompanying figures.

BRIEF DESCRIPTION OF THE DRAWINGS

FIG. 5 is a block diagram illustrating system for model-driven and automated generation of IT solutions, according to one embodiment;

FIG. 8 illustrates an example of constraint tables, according to one embodiment;

FIG. 10 illustrates an example IT solutions design interface, according to one embodiment.

DETAILED DESCRIPTION

Figure 1:
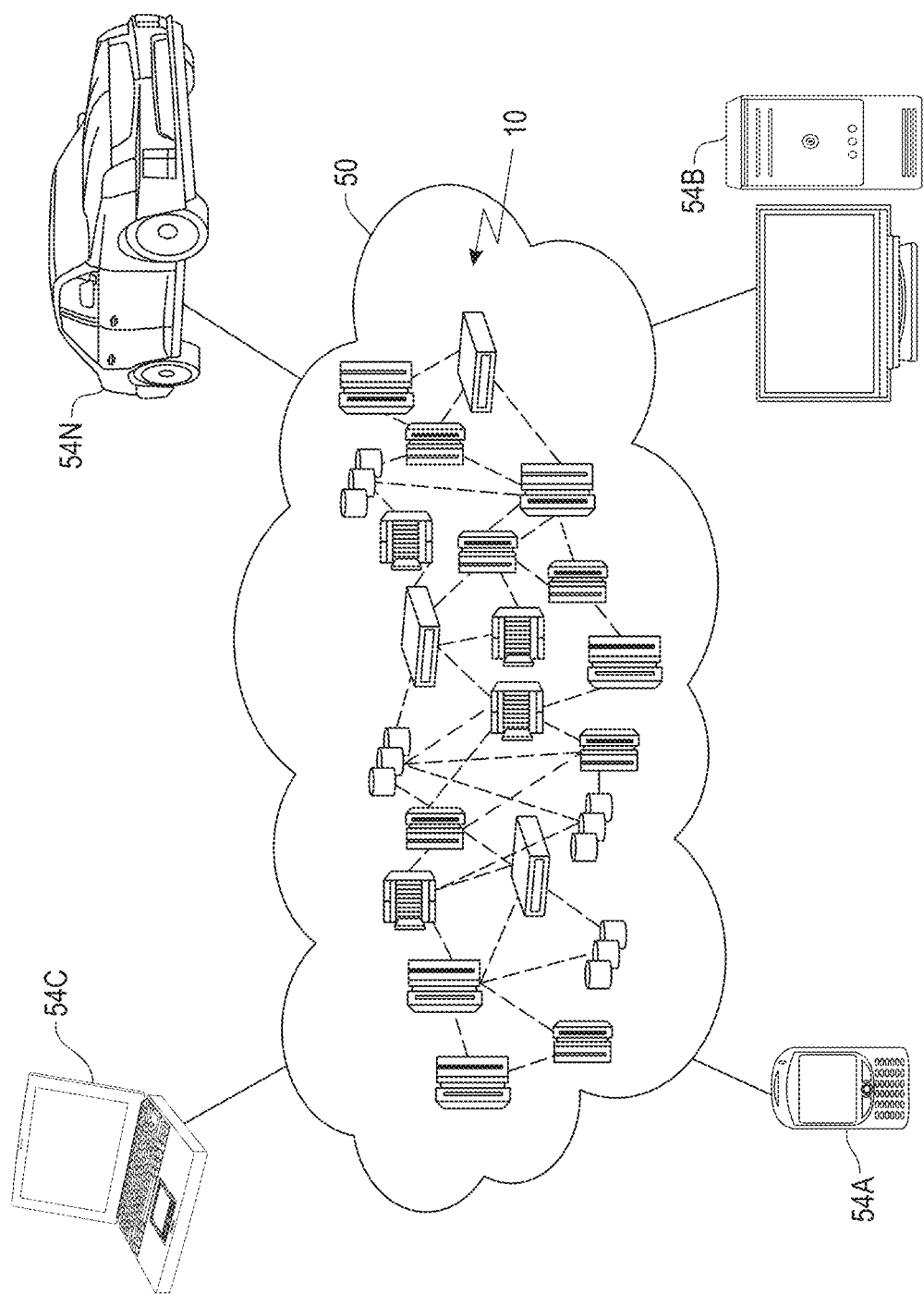
FIG. 1 depicts a cloud computing environment, according to an embodiment.

The descriptions of the various embodiments have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

It is understood in advance that although this disclosure includes a detailed description of cloud computing, implementation of the teachings recited herein are not limited to a cloud computing environment. Rather, embodiments of the present invention are capable of being implemented in conjunction with any other type of computing environment now known or later developed.

One or more embodiments provide for model-driven and automated generation of IT solutions. In one embodiment, a method is provided for model-driven and automated generation of IT solutions including obtaining a set of business and technical requirements for IT infrastructure and applications. A client requirement model is generated based on generic model constructs and extending with constructs specific to capturing client requirements. A draft IT solution is generated using an automated model-driven process to generate the draft IT solution configuration for client requirements for a target shared resource environment (e.g., a cloud computing environment) offering. The generated draft IT solution is translated into a language of a constraint satisfaction engine that propagates values of chosen attributes in the draft solution to identify valid values for unset attributes, and identifies conflicts. An IT solutions interface is generated based on auto-population of verified attribute results.

One or more embodiments provide for a Cloud Solution Design Tool which is a model-driven and automated design tool for the migration of enterprise applications into cloud or shared resource computing environments. The system supports the full lifecycle of sales and technical solution design starting from client requirements to generating a deployable solution configuration, with an associated bill of material for costing/pricing. It takes the client requirements at all levels of an application stack and managed services needs at different client sites, generates a draft solution in the cloud provider offering, and then generates an itemized bill of materials for costing and pricing, along with the configuration of the solution that will be delivered to the customer. The system also offers a guided solutioning approach to enable solution architects not only to create valid solutions from scratch, but also to modify an existing solution configuration in conformance with the provider cloud offerings.

Cloud computing is a model of service delivery for enabling convenient, on-demand network access to a shared pool of configurable computing resources (e.g., networks, network bandwidth, servers, processing, memory, storage, applications, virtual machines (VMs), and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed and automatically, without requiring human interaction with the service's provider.

Broad network access: capabilities are available over a network and accessed through standard mechanisms that promote use by heterogeneous, thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or data center).

Rapid elasticity: capabilities can be rapidly and elastically provisioned and, in some cases, automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active consumer accounts). Resource usage can be monitored, controlled, and reported, thereby providing transparency for both the provider and consumer of the utilized service.

Service Models are as follows:

Software as a Service (SaaS): the capability provided to the consumer is the ability to use the provider's applications running on a cloud infrastructure. The applications are accessible from various client devices through a thin client interface, such as a web browser (e.g., web-based email). The consumer does not manage or control the underlying cloud infrastructure including network, servers, operating systems, storage, or even individual application capabilities, with the possible exception of limited consumer-specific application configuration settings.

Platform as a Service (PaaS): the capability provided to the consumer is the ability to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application-hosting environment configurations.

Infrastructure as a Service (IaaS): the capability provided to the consumer is the ability to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load balancing between clouds).

A cloud computing environment is a service oriented with a focus on statelessness, low coupling, modularity, and semantic interoperability. At the heart of cloud computing is an infrastructure comprising a network of interconnected nodes.

Referring now to FIG. 1, an illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as private, community, public, or hybrid clouds as described hereinabove, or a combination thereof. This allows the cloud computing environment 50 to offer infrastructure, platforms, and/or software as services for which a cloud consumer does not need to maintain resources on a local computing device. It is understood that the types of computing devices 54A-N shown in FIG. 2 are intended to be illustrative only and that computing nodes 10 and cloud computing environment 50 can communicate with any type of computerized device over any type of network and/or network addressable connection (e.g., using a web browser).

Figure 2:
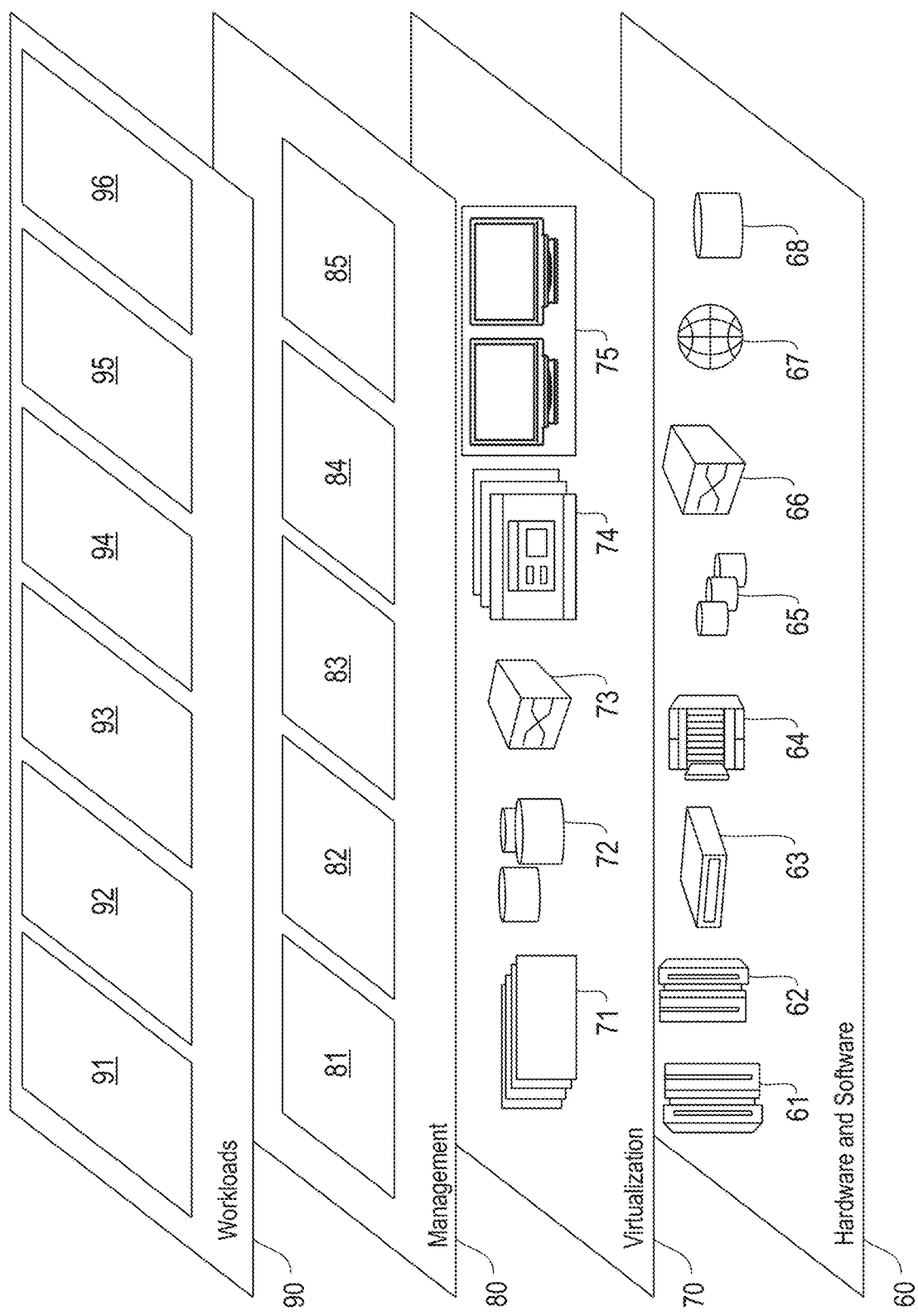
FIG. 2 depicts a set of abstraction model layers, according to an embodiment.

Referring now to FIG. 2, a set of functional abstraction layers provided by the cloud computing environment 50 (FIG. 1) is shown. It should be understood in advance that the components, layers, and functions shown in FIG. 2 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, a management layer 80 may provide the functions described below. Resource provisioning 81 provides dynamic procurement of computing resources and other resources that are utilized to perform tasks within the cloud computing environment. Metering and pricing 82 provide cost tracking as resources are utilized within the cloud computing environment and billing or invoicing for consumption of these resources. In one example, these resources may comprise application software licenses. Security provides identity verification for cloud consumers and tasks as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and model-driven and automated generation of IT solutions processing 96. As mentioned above, all of the foregoing examples described with respect to FIG. 2 are illustrative only, and the invention is not limited to these examples.

It is understood all functions of one or more embodiments as described herein may be typically performed by the processing system 300 (FIG. 3) or the autonomous cloud environment 410 (FIG. 4), which can be tangibly embodied as hardware processors and with modules of program code. However, this need not be the case for non-real-time processing. Rather, for non-real-time processing the functionality recited herein could be carried out/implemented and/or enabled by any of the layers 60, 70, 80 and 90 shown in FIG. 2.

It is reiterated that although this disclosure includes a detailed description on cloud computing, implementation of the teachings recited herein are not limited to a cloud computing environment. Rather, the embodiments of the present invention may be implemented with any type of clustered computing environment now known or later developed.

Figure 3:
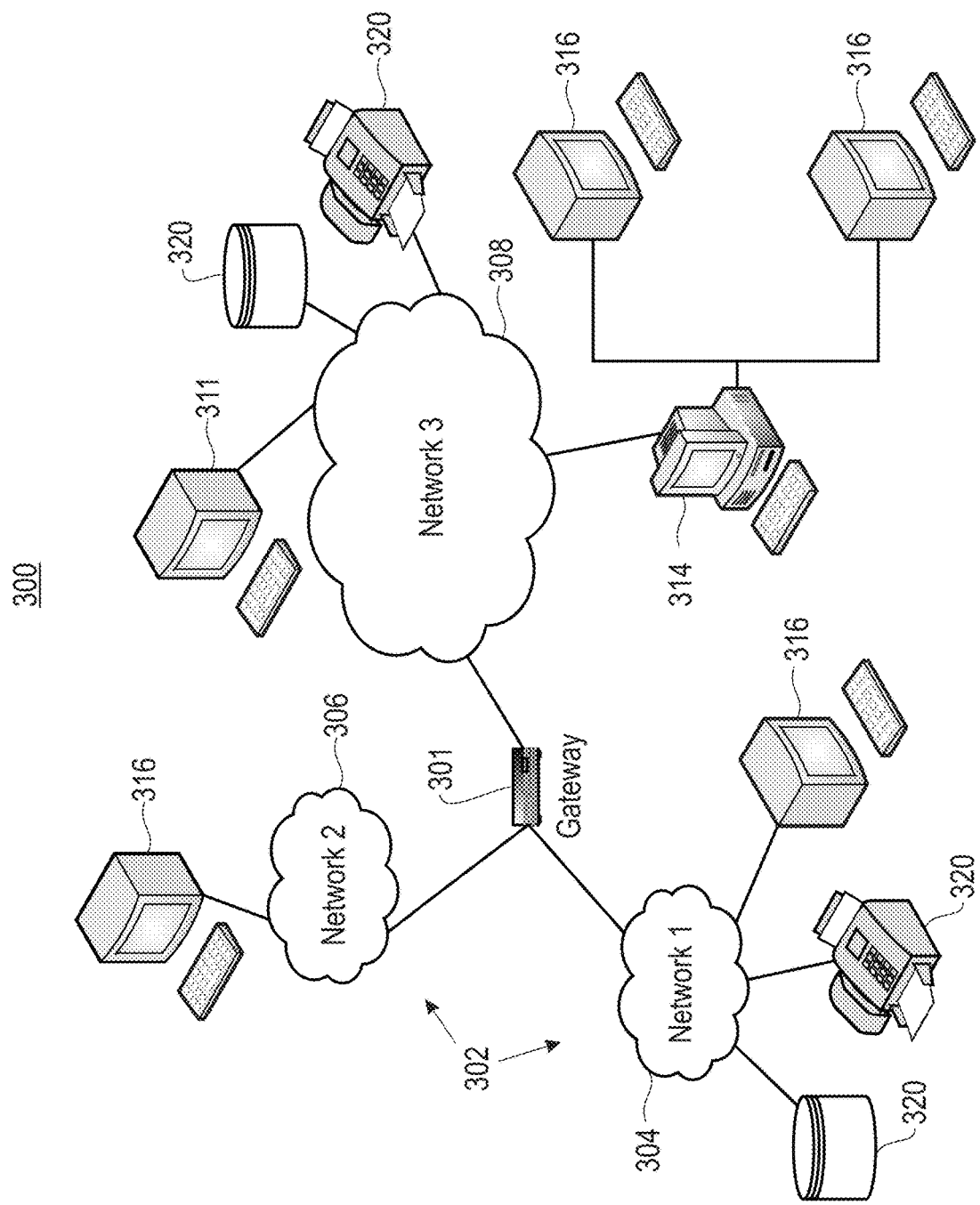
FIG. 3 is a network architecture for efficient representation, access and modification of variable length data objects, according to an embodiment.

FIG. 3 illustrates a network architecture 300, in accordance with one embodiment. As shown in FIG. 3, a plurality of remote networks 302 are provided, including a first remote network 304 and a second remote network 306. A gateway 301 may be coupled between the remote networks 302 and a proximate network 308. In the context of the present network architecture 300, the networks 304, 306 may each take any form including, but not limited to, a LAN, a WAN, such as the Internet, public switched telephone network (PSTN), internal telephone network, etc.

In use, the gateway 301 serves as an entrance point from the remote networks 302 to the proximate network 308. As such, the gateway 301 may function as a router, which is capable of directing a given packet of data that arrives at the gateway 301, and a switch, which furnishes the actual path in and out of the gateway 301 for a given packet.

Further included is at least one data server 314 coupled to the proximate network 308, which is accessible from the remote networks 302 via the gateway 301. It should be noted that the data server(s) 314 may include any type of computing device/groupware. Coupled to each data server 314 is a plurality of user devices 316. Such user devices 316 may include a desktop computer, laptop computer, handheld computer, printer, and/or any other type of logic-containing device. It should be noted that a user device 311 may also be directly coupled to any of the networks in some embodiments.

A peripheral 320 or series of peripherals 320, e.g., facsimile machines, printers, scanners, hard disk drives, networked and/or local storage units or systems, etc., may be coupled to one or more of the networks 304, 306, 308. It should be noted that databases and/or additional components may be utilized with, or integrated into, any type of network element coupled to the networks 304, 306, 308. In the context of the present description, a network element may refer to any component of a network.

According to some approaches, methods and systems described herein may be implemented with and/or on virtual systems and/or systems, which emulate one or more other systems, such as a UNIX system that emulates an IBM z/OS environment, a UNIX system that virtually hosts a MICROSOFT WINDOWS environment, a MICROSOFT WINDOWS system that emulates an IBM z/OS environment, etc. This virtualization and/or emulation may be implemented through the use of VMWARE software in some embodiments.

Figure 4:
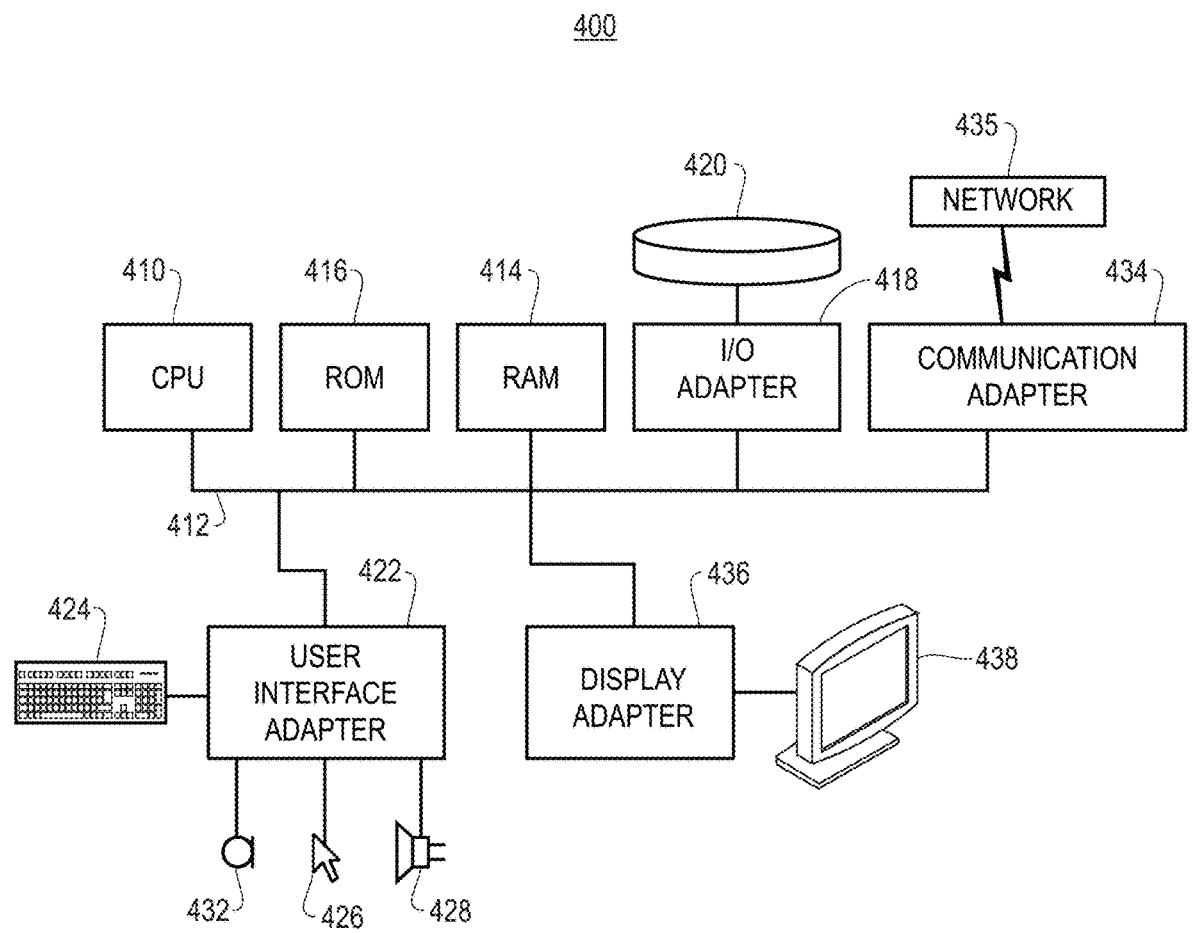
FIG. 4 shows a representative hardware environment that may be associated with the servers and/or clients of FIG. 1, according to an embodiment.

FIG. 4 shows a representative hardware system 400 environment associated with a user device 316 and/or server 314 of FIG. 3, in accordance with one embodiment. In one example, a hardware configuration includes a workstation having a central processing unit 410, such as a microprocessor, and a number of other units interconnected via a system bus 412. The workstation shown in FIG. 4 may include a Random Access Memory (RAM) 414, Read Only Memory (ROM) 416, an I/O adapter 418 for connecting peripheral devices, such as disk storage units 420 to the bus 412, a user interface adapter 422 for connecting a keyboard 424, a mouse 426, a speaker 428, a microphone 432, and/or other user interface devices, such as a touch screen, a digital camera (not shown), etc., to the bus 412, communication adapter 434 for connecting the workstation to a communication network 435 (e.g., a data processing network) and a display adapter 436 for connecting the bus 412 to a display device 438.

In one example, the workstation may have resident thereon an operating system, such as the MICROSOFT WINDOWS Operating System (OS), a MAC OS, a UNIX OS, etc. In one embodiment, the system 400 employs a POSIX® based file system. It will be appreciated that other examples may also be implemented on platforms and operating systems other than those mentioned. Such other examples may include operating systems written using JAVA, XML, C, and/or C++ language, or other programming languages, along with an object oriented programming methodology. Object oriented programming (OOP), which has become increasingly used to develop complex applications, may also be used.

FIG. 5 is a block diagram illustrating a system 500 for model-driven and automated generation of IT solutions, according to one embodiment. In one embodiment, the system 500 includes client devices 510 (e.g., mobile devices, smart devices, computing systems, etc.), a cloud or resource sharing environment 520 (e.g., a public cloud computing environment, a private cloud computing environment, a datacenter, etc.), and servers 530. In one embodiment, the client devices are provided with cloud services from the servers 530 through the cloud or resource sharing environment 520.

In one embodiment, system 500 supports the full lifecycle of sales and technical solution design starting from client requirements to generating a deployable solution configuration, with an associated bill of material for costing/pricing. System 500 takes the client requirements at all levels of an application stack and managed services needs at different client sites (e.g., clients 510), generates a draft solution in the cloud provider offering, and then generates an itemized bill of materials for costing and pricing, along with an interface for the configuration of the solution that will be delivered to the customer. System 500 also offers a guided solutioning approach to enable solution architects not only to create valid solutions from scratch, but also to modify an existing solution configuration in conformance with the provider cloud offerings.

Figure 6:
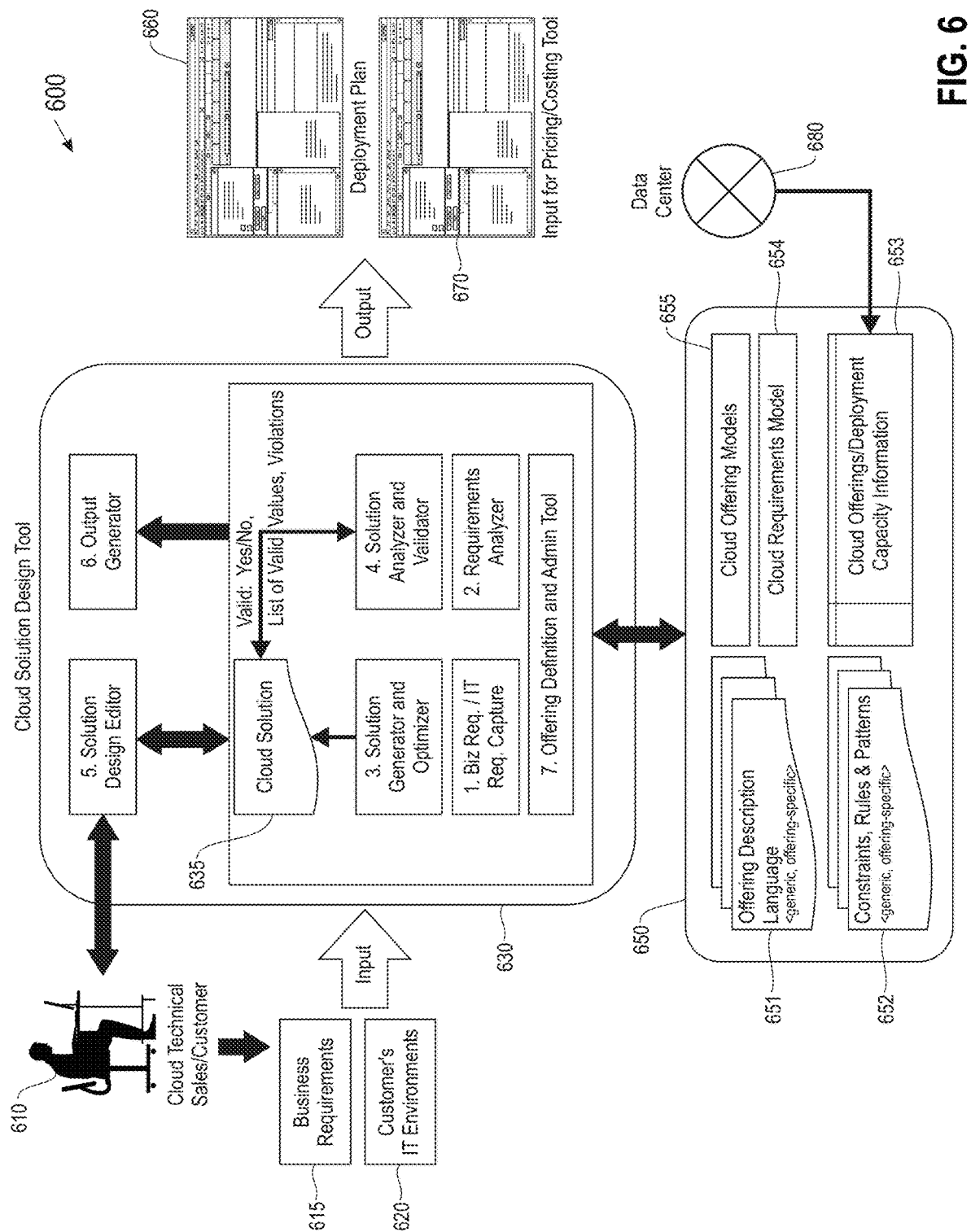
FIG. 6 illustrates block diagram for a system flow for model-driven and automated generation of IT solutions, according to one embodiment.

FIG. 6 illustrates block diagram for an architecture 600 and system flow for model-driven and automated generation of IT solutions, according to one embodiment. In one embodiment, the architecture 600 includes input (e.g., client requirement model, from a cloud technical sales/customer 610, that includes business requirements 615 and customer's IT environment(s) 620), cloud solution design tool 630, an extensible data model 650, output (e.g., a deployment plan 660 and input pricing/costing tool interface 670) and a datacenter 680. In one embodiment, the cloud solution design tool 630 includes business requirement/IT requirement capture engine 1, a requirements analyzer 2, a solution generator and optimizer 3, a solution analyzer and validator 4, a solution design editor 5, output generator 6, and offering definition and administration tool 7. In one embodiment, the data model 650 includes an offering description language 651, constraints, rules and patterns repository (e.g., database, etc.) 652, cloud offering/deployment capacity information repository (e.g., database) 653, a cloud requirements model 654 and cloud offering models 655.

In one embodiment, the architecture of the cloud solution design tool 630 is backed with an extensible data model 650. The data model 650 includes the cloud requirements model 654 that includes a set of generic cloud data elements (such as a virtual machine (VM) including CPU, RAM, Storage, and network interfaces; Database, and Application) on top of the cloud offering model 655 which offering-specific entities are defined (for example, different types of VMs, databases, applications, etc.). For example, for SAP Offerings, the notions of SAP Systems, which include a specific SAP product, and the notion of SAP Landscape is defined, which provides a logical grouping of a number of SAP Systems for offering the same product across different phases (development, test/quality assurance (QA), training, production, etc.). The client requirement model is described by building on the generic model constructs, and by extending with those that are specific to capturing client's requirements. The cloud offering models 655 extend the base generic model to describe a specific provider's cloud offerings including applicable constraints, mapping and transformation rules, as well as solution patterns (pre-built solution offerings) from the constraints, rules and patterns repository 652.

In one embodiment, the cloud solution design tool 630 includes a solution generator and optimizer (or configuration generator) 3 offers an automated, model-driven approach to generate a draft solution configuration for given client requirements for a target cloud offering. The solution analyzer (or configuration analyzer) and validator 4 takes the generated draft (cloud) solution 635 and translates it into the language of a constraint satisfaction engine (using the offering description language 651) that does two things: (1) propagates the values of chosen attributes in the draft solution to identify valid values for unset attributes, and (2) if there is any conflict, identifies the conflicting attributes/values through finding an unsatisfiable core.

In one embodiment, the requirements analyzer 2 takes a similar approach to validate the requirements with respect to the selected offering, ensuring the requirements can be met by the offering. The solution (or configuration) design editor 5 offers a guided solutioning assistant to the solution architect, that is solutioning from scratch or modifying an existing solution through a value propagation process in the constraint satisfaction solver. The solution design editor 5 provides the architect to make valid solution choices with respect to the target cloud offering.

Figure 7:
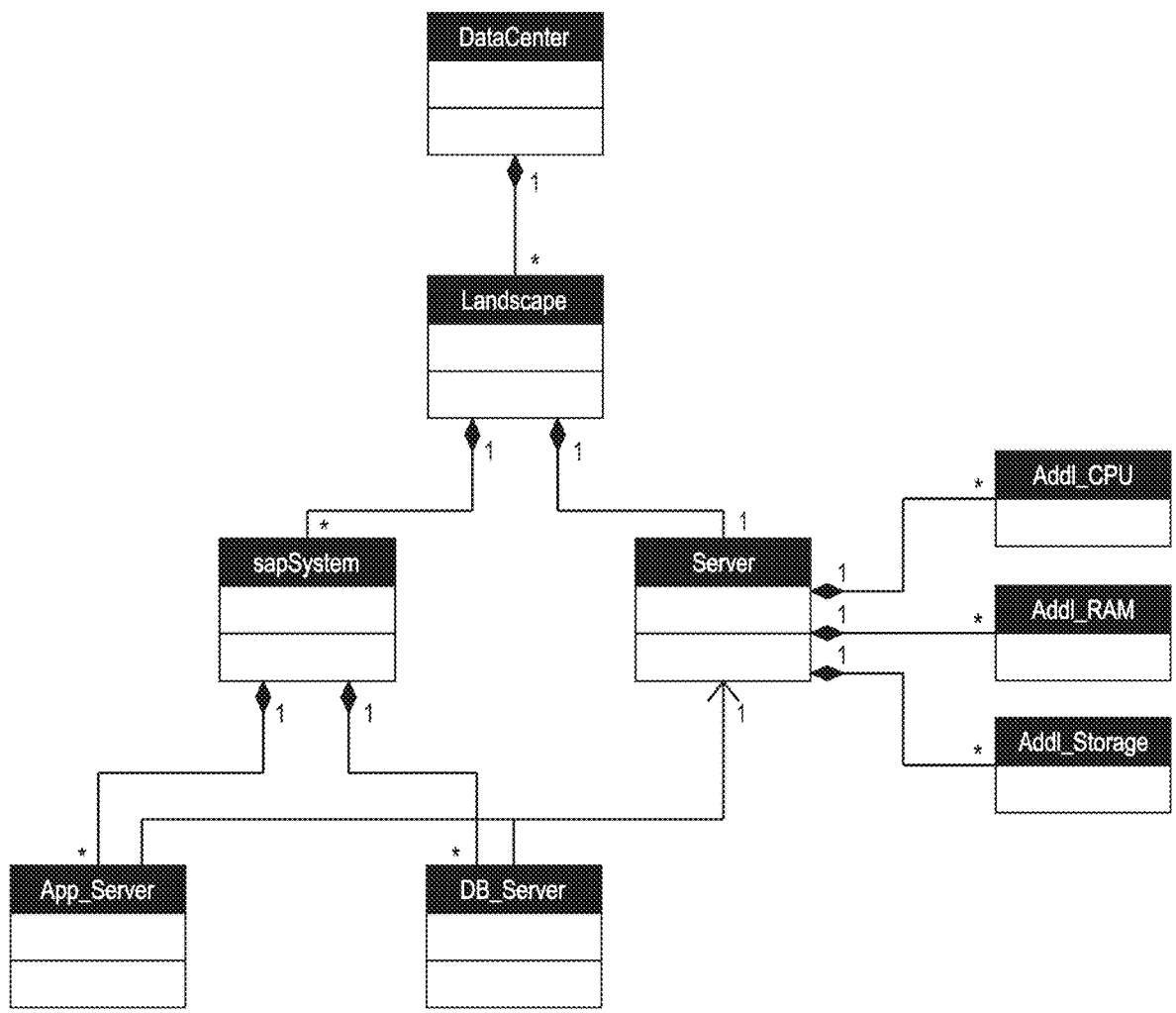
FIG. 7 illustrates an example diagram of a cloud data model (requirements and configuration), according to one embodiment.

FIG. 7 illustrates an example representative diagram 700 of a cloud requirements model 654 (requirements and configuration), according to one embodiment. In the example diagram 700, the cloud data model 654 includes a datacenter, a landscape, a sapSystem, an app server, a database (DB) server, a server, additional CPUs, additional RAM, and additional storage. Each cloud data model 650 may vary customer to customer, as with the respective components of the cloud data model 650.

FIG. 8 illustrates an example representation 800 of constraint tables from the constraints, rules and patterns repository 652, according to one embodiment. In the example representation 800, the table includes columns for SAP products, product types table, unavailable SAP product and analytic workload tool. The constraint tables may include many other product types, products, etc.

Figure 9:
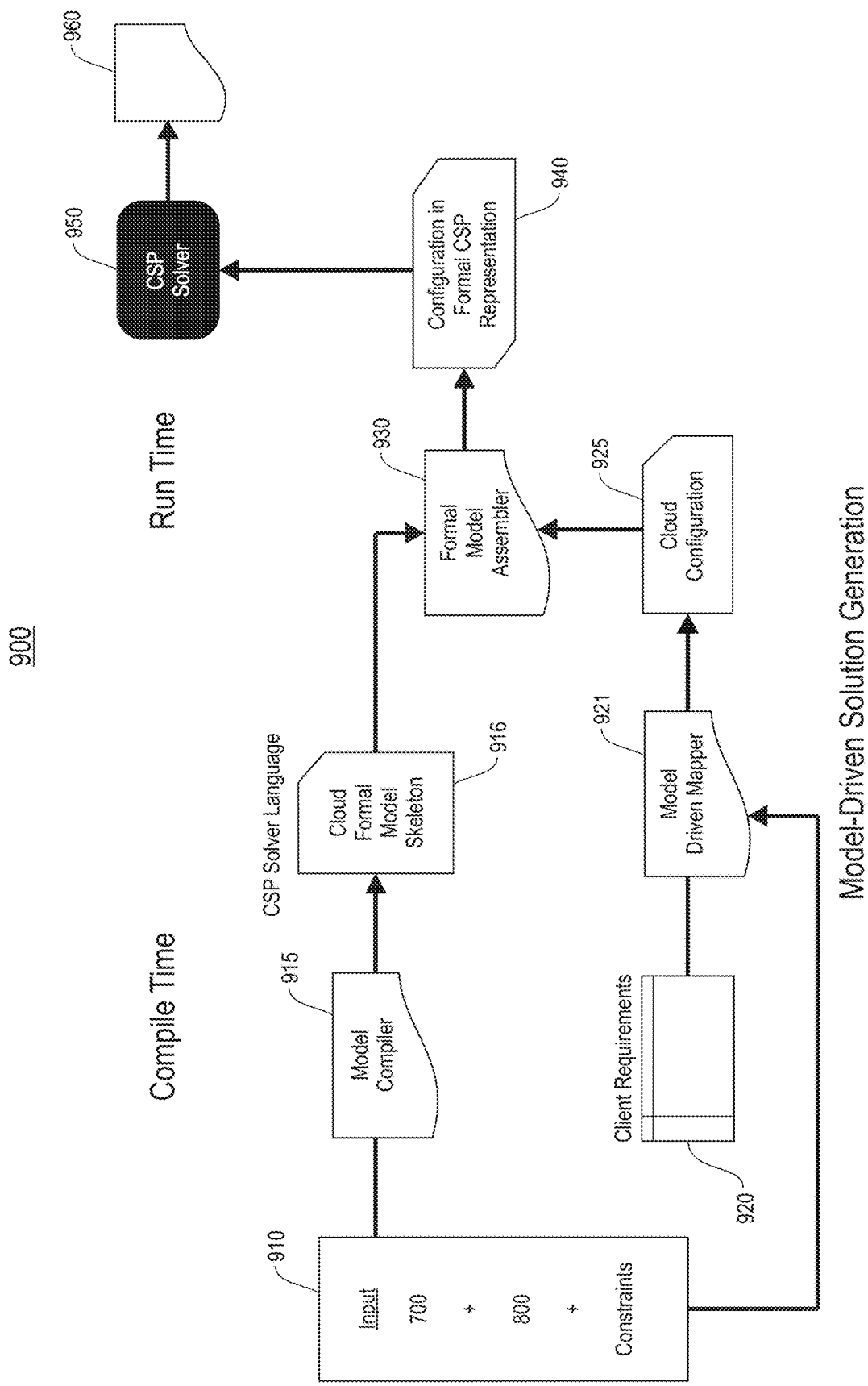
FIG. 9 illustrates a flow diagram for a model-driven solution generation and validation, according to one embodiment.

FIG. 9 illustrates a flow diagram 900 for a model-driven solution generation and validation using the cloud solution design tool 630 (FIG. 6), according to one embodiment. The input 910 includes, for example, the elements from the example representative diagram 700 (FIG. 7), elements from the example representation 800 (FIG. 8) and other constraints from the constraints, rules and patterns repository 652. The flow diagram 900 includes a model compiler 915, a cloud formal model skeleton 916 (that uses constraint satisfaction problem (CSP) solver language), client requirements 920 (e.g., business requirements 615 and customer's IT environments 620), a model driven mapper 921, cloud configuration 925, formal model assembler 930, configuration in formal CSP representation 940, CSP solver 950 and outputs 960 (e.g., deployment plan 660, input for pricing/costing tool 670, an IT solutions design interface, etc.).

In one embodiment, the cloud solution design tool 630 includes the model-driven solution generation, compile time, and run time phases. In the model-driven solution generation phase, the input 910 and the client requirements 920 are input to the model driven mapper 921. The output from the model driven mapper 921 includes the cloud configuration 925. In the compile time phase, the input 910 is fed to the model compiler 915. The output from the model compiler 915 is fed to the cloud formal model skeleton 916 in language translated to CSP solver language. The results from the cloud formal model skeleton 916 and the cloud configuration 925 are fed to the formal model assembler 930. The results from the formal model assembler 930 are configured in the configuration in formal CSP representation 940. The formal CSP representation is fed to the CSP solver resulting in the outputs 960.

The area of cloud application design has received attention in academia and in industry. topology and orchestration specification for cloud applications (TOSCA) offers a language for representing an application architecture and deployable application components. CloudML offers a language for representing cloud applications with a focus on managing elasticity and scalability of cloud applications at deployment time. Open cloud computing interface (OCCI) offers a generic metamodel and a model-driven approach for cloud application deployment. All of these conventional approaches, however, focus on application architecture and management of deployed applications in the cloud environment. The cloud solution design tool 630 (FIG. 6) fills the gap of cloud solution design starting from client requirements in the sales lifecycle, and offers an automated and model-driven approach for solution generation, offers guided solutioning, solution validation and costing/pricing of solutions starting from client requirements. In industry, MICROSOFT® offers MICROSOFT® assessment and planning (MAP) toolkit, which supports assessment and planning of migrating Windows-based servers to MICROSOFT® Azure platform. However, the cloud solution design tool 630 offers a generic, model-driven and automated approach for migration of application-level projects (not only VMs) to cloud environments. The cloud solution design tool 630 extensible offering language allows supporting new offerings through describing its model and constraints.

FIG. 10 illustrates an example IT solutions design interface 1000, according to one embodiment. The IT solutions design interface 1000 demonstrates the use of the cloud solution design tool 630 (FIG. 6) for client requirements capture, automated solution generation, guided solution generation including value propagation, as well as conflict identification and resolution, and the generation of deployable solution configuration specifications through a number of example scenarios. The IT solutions design interface 1000 includes features, such as interfaces for managing projects, project overview, business inputs, current IT environment, solution (as shown) and output. The IT solutions design interface 1000 provides for a tabular design editor or a graphical design editor. Other features may include, but are not limited to, debug of the validator, export solution spreadsheet, and show by server. In one embodiment, the IT solutions design interface 1000 provides, on the solution interface page, for adding landscape, duplicating, toggle, delete, add SAP system and add a datacenter.

Figure 11:
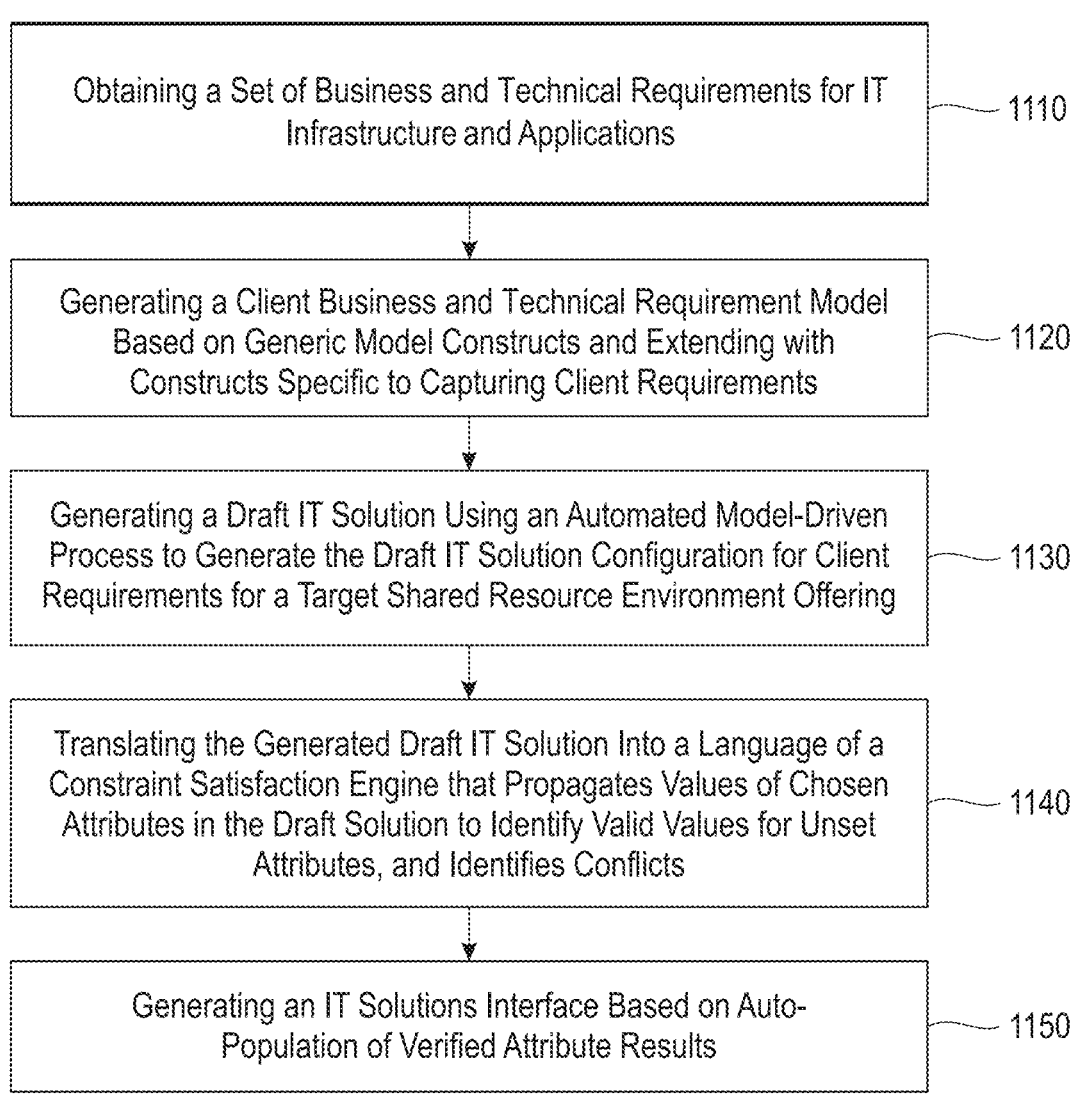
FIG. 11 illustrates a block diagram for a process for model-driven and automated generation of IT solutions, according to one embodiment.

FIG. 11 illustrates a block diagram for a process 1100 for model-driven and automated generation of IT solutions, according to one embodiment. In block 1110, process 1100 obtains a set of business and technical requirements for IT infrastructure and applications. In block 1120, process 1100 generates a client business and technical requirement model based on generic model constructs and extending with constructs specific to capturing client requirements. In block 1130, process 1100 generates a draft IT solution using an automated model-driven process to generate the draft IT solution configuration for client requirements for a target shared resource environment offering. In block 1140, process 1100 translates the generated draft IT solution into a language of a constraint satisfaction engine that propagates values of chosen attributes in the draft solution to identify valid values for unset attributes, and identifies conflicts. In block 1150, process 1100 generates an IT solutions interface based on auto-population of verified attribute results.

In one embodiment, in process 1100 the set of requirements are based on business-level, hardware, network, storage, software and labor requirements. In one embodiment, the target shared resource environment may be at least one of: a public cloud computing environment, a private cloud computing environment and datacenter. In one embodiment, the draft IT solution is a cloud client solution configuration skeleton. In one embodiment, the cloud client solution configuration skeleton is processed by populating data objects with valid configuration data, and generating additional required constructs in an IT solution using a constraint satisfaction process.

In one embodiment, process 1100 may further include obtaining, by a model compiler, a formal cloud model skeleton and a client configuration skeleton, and generating, by the model compiler, a configuration solution in a formal constraint satisfaction model. Process 1100 may further include processing the configuration solution using a constraint satisfaction solver. In one embodiment, in process 1100 the conflicts include identified potential errors in the configuration solution as a result of received edits from a design editor interface.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

References in the claims to an element in the singular is not intended to mean "one and only" unless explicitly so stated, but rather "one or more." All structural and functional equivalents to the elements of the above-described exemplary embodiment that are currently known or later come to be known to those of ordinary skill in the art are intended to be encompassed by the present claims. No claim element herein is to be construed under the provisions of 35 U.S.C. section 112, sixth paragraph, unless the element is expressly recited using the phrase "means for" or "step for."

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A method for model-driven and automated generation of information technology (IT) solutions comprising:

receiving, by a processor device, a set of business and technical requirements for IT infrastructure and applications as input by a model compiler computing process from a design tool computing process that employs the processor device including a user interface;

generating, by the design tool computing process that employs the processor device, a client business and technical requirement software model that uses the model compiler computing process that extends generic model constructs with constructs specific to capturing client requirements, the constructs comprising constraints, mapping and transformation rules and solution patterns received by the model compiler computing process from a constraints, rules and patterns repository;

generating, by the design tool computing process that employs the processor device, a draft IT solution configuration by an automated model-driven computing process that generates the draft IT solution configuration for client requirements for a target shared resource computing environment offering;

generating, by the model compiler computing process, output including computer readable compiler code for a configuration solution that is translated and provided in a formal constraint satisfaction computing model, the model compiler computing process uses formal constraint satisfaction problem solver representation from translating the generated draft IT solution configuration into a constraint satisfaction problem solver language of a constraint satisfaction engine computing process;

propagating, by the constraint satisfaction engine computing process, values of attributes in the draft IT solution configuration;

identifying, by the constraint satisfaction engine computing process, valid values for unset attributes, and conflicts that include conflicting attributes in the generated draft IT solution configuration as a result of received edits from a design editor interface of the design tool computing process that employs the processor device;

generating, by a formal model assembler computing process, formal model assembler output results in computer readable assembly code by using results from a formal cloud model skeleton that uses as input the translated computer readable compiler code in the constraint satisfaction problem solver language, and the configuration solution; and generating, by the design tool computing process that employs the processor device, an IT solutions graphical display interface by auto-populating results for the identified valid values for the unset attributes, the IT solutions graphical display interface includes the design editor interface, a debugging computing process for validation processing, and a solution interface page that includes computing processing for adding landscape and a datacenter computing system.

2. The method of claim 1, wherein the set of requirements are based on business-level, hardware, network, storage, software and labor requirements, and the IT solutions graphical display interface further comprises an export function for a solution spreadsheet, and a function that provides display information per server.

3. The method of claim 1, wherein the target shared resource environment comprises at least one of a public cloud computing environment, a private cloud computing environment and the datacenter computing system.

4. The method of claim 3, wherein the draft IT solution configuration comprises a cloud client solution configuration skeleton.

5. The method of claim 4, wherein the cloud client solution configuration skeleton is processed by populating data objects with valid configuration data, and generating additional required constructs in an IT solution by a constraint satisfaction process.

6. The method of claim 1, further comprising:
obtaining, by the design tool computing process that employs the processor device and that employs the model compiler computing process, the formal cloud model skeleton and a client configuration skeleton, wherein the formal cloud model skeleton uses the translated constraint satisfaction problem solver language;
wherein the formal model assembler output results are configured in the formal constraint satisfaction problem solver representation.

7. The method of claim 6, further comprising processing the formal model assembler output results by a constraint satisfaction solver that generates outputs comprising a deployment plan and the IT solutions graphical display interface.

8. The method of claim 7, wherein the design tool computing process that employs the processor device outputs the deployment plan for migration of enterprise applications into a cloud computing environment.

9. A computer program product for model-driven and automated generation of information technology (IT) solutions, the computer program product comprising a computer readable storage medium having program instructions embodied therewith, the program instructions executable by a processor device to cause the processor device to:
receive, by the processor device, a set of business and technical requirements for IT infrastructure and applications as input by a model compiler computing process from a design tool computing process that employs the processor device and includes a user interface;
generate, by the design tool computing process that employs the processor device, a client business and technical requirement software model that uses the model compiler computing process that extends generic model constructs with constructs specific to capturing client requirements, the constructs comprising constraints, mapping and transformation rules and solution patterns received by the model compiler computing process from a constraints, rules and patterns repository;
generate, by the design tool computing process that employs the processor device, a draft IT solution configuration by an automated model-driven computing process that generates the draft IT solution configuration for client requirements for a target shared resource computing environment offering;
generate, by the model compiler computing process of the design tool computing process that employs the processor device, output including computer readable compiler code for a configuration solution that is translated and provided in a formal constraint satisfaction computing model using formal constraint satisfaction problem solver representation from translating the generated draft IT solution configuration into a constraint satisfaction problem solver language of a constraint satisfaction engine computing process;
propagating, by the constraint satisfaction engine computing process, values of chosen attributes in the draft IT solution configuration;
identifying, by the constraint satisfaction engine computing process, identifies valid values for unset attributes, and conflicts that include conflicting attributes in the generated draft IT solution configuration as a result of received edits from a design editor interface of the design tool computing process that employs the processor device;

generate, by a formal model assembler computing process of the design tool computing process that employs the processor device, formal model assembler output results in computer readable assembly code by using results from a formal cloud model skeleton that uses as input the translated computer readable compiler code in the constraint satisfaction problem solver language, and the configuration solution; and generate, by the design tool computing process that employs the processor device, an IT solutions graphical display interface by auto-populating results for the identified valid values for the unset attributes, the IT solutions graphical display interface includes the design editor interface, a debugging computing process for validation processing, and a solution interface page that includes computing processing for adding landscape and a datacenter computing system.

10. The computer program product of claim 9, wherein the set of requirements are based on business-level, hardware, network, storage, software and labor requirements, and the IT solutions graphical display interface further comprises an export function for a solution spreadsheet, and a function that provides display information per server.

11. The computer program product of claim 9, wherein the target shared resource environment comprises at least one of a public cloud computing environment, a private cloud computing environment and the datacenter computing system.

12. The computer program product of claim 11, wherein the draft IT solution configuration comprises a cloud client solution configuration skeleton.

13. The computer program product of claim 12, wherein the cloud client solution configuration skeleton is processed by populating data objects with valid configuration data, and generating additional required constructs in an IT solution by a constraint satisfaction process.

14. The computer program product of claim 9, wherein the program instructions executable by the processor further cause the processor to:

obtain, by the design tool computing process that employs the processor device and that employs the model compiler computing process, the formal cloud model skeleton and a client configuration skeleton, wherein the formal cloud model skeleton uses the translated constraint satisfaction problem solver language; and process, by the design tool computing process, the formal model assembler output results by a constraint satisfaction solver of the design tool computing process that employs the processor device, wherein the constraint satisfaction solver generates outputs comprising a deployment plan and the IT solutions graphical display interface;

wherein the formal model assembler output results are configured in the formal constraint satisfaction problem solver representation.

15. The computer program product of claim 14, wherein the design tool computing process that employs the processor device outputs the deployment plan for migration of enterprise applications into a cloud computing environment.

16. An apparatus comprising:
a memory configured to store instructions; and
a processor configured to execute the instructions to:
receive a set of business and technical requirements for information technology (IT) infrastructure and applications as input by a model compiler computing process from a design tool computing process that employs the processor including a user interface;

generate, using the design tool computing process that employs the processor, a client business and technical requirement software model that uses the model compiler computing process that extends generic model constructs with constructs specific to capturing client requirements, the constructs comprising constraints, mapping and transformation rules and solution patterns received by the model compiler computing process from a constraints, rules and patterns repository;

generate, using the design tool computing process that employs the processor, a draft IT solution configuration by an automated model-driven computing process that generates the draft IT solution configuration for client requirements for a target shared resource computing environment offering;

generate, by the model compiler computing process, output including computer readable compiler code for a configuration solution that is translated and provided in a formal constraint satisfaction computing model using formal constraint satisfaction problem solver representation from translating the generated draft IT solution configuration into a constraint satisfaction problem solver language of a constraint satisfaction engine computing process;

propagate by the constraint satisfaction engine computing process, values of chosen attributes in the draft IT solution configuration;

identify, by the constraint satisfaction engine computing process, valid values for unset attributes, and conflicts that include conflicting attributes in the generated draft IT solution configuration as a result of received edits from a design editor interface of the design tool computing process that employs the processor;

generate, by a formal model assembler computing process, formal model assembler output results in computer readable assembly code by using results from a formal cloud model skeleton that uses as input the translated computer readable compiler code in the constraint satisfaction problem solver language, and the configuration solution; and generate, using the design tool computing process that employs the processor, an IT solutions graphical display interface by auto-populating results for the identified valid values for the unset attributes, the IT solutions graphical display interface includes the design editor interface, a debugging computing process for validation processing, and a solution interface page that includes computing processing for adding landscape and a datacenter computing system.

17. The apparatus of claim 16, wherein:
the set of requirements are based on business-level, hardware, network, storage, software and labor requirements;
the IT solutions graphical display interface comprises an export function for a solution spreadsheet, and a function that provides display information per server;
the target shared resource environment comprises at least one of a public cloud computing environment, a private cloud computing environment and the datacenter computing system; and the draft IT solution configuration comprises a cloud client solution configuration skeleton.

18. The apparatus of claim 17, wherein the cloud client solution configuration skeleton is processed by populating data objects with valid configuration data, and generating additional required constructs in an IT solution by a constraint satisfaction process.

19. The apparatus of claim 18, wherein the processor is further configured to execute the instructions to:
 obtain, using the design tool computing process that employs the processor and the model compiler computing process, the formal cloud model skeleton and a client configuration skeleton, wherein the formal cloud model skeleton uses the translated constraint satisfaction problem solver language;
 wherein the formal model assembler output results are configured in the formal constraint satisfaction problem solver representation, and the design tool computing process that employs the processor outputs the deployment plan for migration of enterprise applications into a cloud computing environment.

20. The apparatus of claim 19, wherein the processor is further configured to execute the instructions to:
 process, using the design tool computing process that employs the processor, the formal model assembler output results by a constraint satisfaction solver of the design tool computing process that employs the processor, and the constraint satisfaction solver generates outputs comprising a deployment plan and the IT solutions graphical display interface.

* * * * *